US012718719B2

(12) United States Patent
Wu et al.

(10) Patent No.: US 12,718,719 B2
(45) Date of Patent: Aug. 25, 2026

(54) PROJECTED IMAGE CORRECTION SYSTEM, PROJECTED IMAGE CORRECTION METHOD AND NON-TRANSITORY COMPUTER-READABLE RECORDING MEDIUM

(71) Applicant: Coretronic Corporation, Hsin-Chu (TW)

(72) Inventors: Chun-Hsien Wu, Hsin-Chu (TW); Ssu-Ming Chen, Hsin-Chu (TW); Chih-Hao Wu, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 19/084,712

(22) Filed: Mar. 19, 2025

(65) Prior Publication Data

US 2025/0308417 A1 Oct. 2, 2025

Related U.S. Application Data

(60) Provisional application No. 63/571,452, filed on Mar. 29, 2024.

(30) Foreign Application Priority Data

Jun. 26, 2024 (CN) ......................... 202410835172.4

(51) Int. Cl.
*G09G 3/00* (2006.01)
*G06F 3/041* (2006.01)
(Continued)

(52) U.S. Cl.
CPC ......... *G09G 3/002* (2013.01); *G06F 3/04166* (2019.05); *G06T 5/80* (2024.01);
(Continued)

(58) Field of Classification Search
CPC ...... H04N 9/3185; H04N 9/3194; G06T 5/80; G06T 2200/24; G06F 3/04166; G09G 3/002; G09G 3/3648; G09G 2354/00
See application file for complete search history.

(56) References Cited

U.S. PATENT DOCUMENTS

2012/0188052 A1* 7/2012 Rosenblatt ............ G08C 17/02 340/4.3
2023/0421735 A1* 12/2023 Osada ................. H04N 9/3185

FOREIGN PATENT DOCUMENTS

CN 106657951 5/2017
CN 108319461 7/2018
(Continued)

OTHER PUBLICATIONS

Julian Seifert et al., "PointerPhone: Using Mobile Phones for Direct Pointing Interactions with Remote Displays", Human-Computer Interaction—INTERACT 2013—14th IFIP TC 13 International Conference, Sep. 2-6, 2013, pp. 18-35, vol. 8119.
(Continued)

*Primary Examiner* — Yaron Cohen
(74) *Attorney, Agent, or Firm* — JCIPRNET

(57) ABSTRACT

Disclosed are a projected image correction system, a projected image correction method and a non-transitory computer-readable recording medium. The projected image correction system includes a projector and a portable electronic device. In the portable electronic device, a user interface with multiple icons is displayed; a function interface corresponding to a selected icon is displayed; in response to operation of the function interface and sensing of an acceleration sensor, the first and the second motion sensing data are respectively received from the acceleration sensor at the first and the second time points sequentially; parameter correction amount corresponding to a function type of the operation is calculated based on the first and the second
(Continued)

motion sensing data; and at the second time point, the function type and parameter correction amount are transmitted to the projector, so that the projector adjusts the projected image based on the function type and parameter correction amount.

19 Claims, 14 Drawing Sheets

(51) Int. Cl.
*G06T 5/80* (2024.01)
*G09G 3/36* (2006.01)

(52) U.S. Cl.
CPC ........ *G09G 3/3648* (2013.01); *G06T 2200/24* (2013.01); *G09G 2354/00* (2013.01)

(56) References Cited

FOREIGN PATENT DOCUMENTS

| | | |
|---|---|---|
| CN | 112702584 | 4/2021 |
| CN | 115103169 | 2/2024 |

OTHER PUBLICATIONS

Gang Pan et al., "EasyPointer: What You Pointing at is What You Get", Proceedings of the International Conference on Human Factors in Computing Systems, CHI 2011, May 7-12, 2011, pp. 499-502.
"Search Report of Europe Counterpart Application", issued on Jul. 30, 2025, p. 1-p. 10.
"Office Action of Taiwan Counterpart Application", issued on Aug. 19, 2025, p. 1-p. 10.

* cited by examiner

PROJECTED IMAGE CORRECTION SYSTEM, PROJECTED IMAGE CORRECTION METHOD AND NON-TRANSITORY COMPUTER-READABLE RECORDING MEDIUM

CROSS-REFERENCE TO RELATED APPLICATION

This application claims the priority benefit of U.S. provisional application Ser. No. 63/571,452, filed on Mar. 29, 2024, and China application serial no. 202410835172.4, filed on Jun. 26, 2024. The entirety of the above-mentioned patent applications is hereby incorporated by reference herein and made a part of this specification.

BACKGROUND OF THE DISCLOSURE

Field of the Disclosure

The present disclosure relates to an image correction mechanism, and in particular, to a projected image correction system, a projected image correction method and a non-transitory computer-readable recording medium.

Description of Related Art

Existing projectors are equipped with a manual or automatic keystone correction function, which may be used to correct a trapezoidal projected image into a rectangular image.

The existing keystone correction method is performed by using a remote control to enter the on-screen display (OSD) menu projected by the projector, and then selecting at least one of horizontal (H) correction, vertical (V) correction, and rotation (R) correction to adjust the value. The user performs correction by continuously clicking on the direction buttons, namely up, down, left, and right, on the remote control. After completing the correction for one of the above items, the correction option is switched to the next one, and the above steps are repeated until the projected image meets expectations and becomes a rectangular image. Generally speaking, users have no intuitive senses of horizontal (H) correction, vertical (V) correction, and rotation (R) correction, and they have to make several attempts to know the changes caused by the three parameters H, V, and R to the projected image respectively when making adjustment to the image. Besides, it is required for the user to click multiple times if it is desired to make an adjustment to a large extent, which is time-consuming and difficult to operate.

On the other hand, the existing four-corner correction method is similar to the above method. The user uses the remote control to enter the OSD menu, then selects one of the four corners and adjust the displacement of the selected corner, and performs corrections by clicking on the direction buttons, namely up, down, left, and right, on the remote control continuously. After completing the correction of the selected corner, the correction operation is switched to the next direction, and the above steps are repeated until the projected image meets expectations and becomes a rectangular image. When adopting the above method, the user not only needs to select the corner to be adjusted, but the deformation amount of each corner further includes at least two parameters (for example, horizontal and vertical). It is required for the user to click multiple times if it is desired to make an adjustment to a large extent, and which causes repeated operations.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY OF THE DISCLOSURE

The projected image correction system of the present disclosure includes a projector and a portable electronic device, wherein the projector is configured to project a projected image, the portable electronic device is communicatively connected to the projector, and the portable electronic device includes an acceleration sensor and a processor. The processor is adapted to receive at least one motion sensing data for the portable electronic device from the acceleration sensor. The processor of the portable electronic device is configured to execute an application to: enable the portable electronic device to display a user interface, wherein the user interface has a plurality of icons; in response to one of the plurality of icons being selected as a selected icon, display a function interface corresponding to the selected icon; in response to an operation of the function interface and a sensing of the acceleration sensor, receive a first motion sensing data and a second motion sensing data for the portable electronic device from the acceleration sensor at a first time point and a second time point in sequence respectively, wherein the at least one motion sensing data includes the first motion sensing data and the second motion sensing data; calculate a first parameter correction amount for a function type corresponding to the operation of the function interface based on the first motion sensing data and the second motion sensing data; and transmit the first parameter correction amount and the function type corresponding to the operation of the function interface to the projector at the second time point. The projector is configured to adjust the projected image based on the first parameter correction amount and the function type corresponding to the operation of the function interface transmitted from the portable electronic device.

The projected image correction method of the present disclosure is adaptable for a projected image correction system, the projected image correction system includes a projector and a portable electronic device. The projector is configured to project a projected image, the portable electronic device is communicatively connected to the projector, and the portable electronic device includes an acceleration sensor and a processor. The processor is adapted to receive at least one motion sensing data for the portable electronic device from the acceleration sensor. The processor is configured to execute an application to perform the following steps: enabling the portable electronic device to display a user interface, wherein the user interface has a plurality of icons; in response to one of the plurality of icons being selected as a selected icon, displaying a function interface corresponding to the selected icon; in response to an operation of the function interface and a sensing of the acceleration sensor, receiving a first motion sensing data and a second motion sensing data for the portable electronic device from the acceleration sensor at a first time point and a second time point in sequence respectively, wherein the at least one motion sensing data includes the first motion sensing data and the second motion sensing data; calculating a first parameter correction amount for a function type corresponding to the operation of the function interface based on the first motion sensing data and the second motion sensing data; and transmitting the first parameter correction amount and the function type corresponding to the operation of the function interface to the projector at the second time point, so that the projector adjusts the projected image based on the first parameter correction amount and the function type corresponding to the operation of the function interface transmitted from the portable electronic device.

The non-transitory computer-readable recording medium of the present disclosure records an application, and loads the application through a processor of a portable electronic device to perform the following steps: enabling the portable electronic device to display a user interface, wherein the user interface has a plurality of icons; in response to one of the plurality of icons being selected as a selected icon, displaying a function interface corresponding to the selected icon; in response to an operation of the function interface and a sensing of an acceleration sensor of the portable electronic device, receiving a first motion sensing data and a second motion sensing data for the portable electronic device from the acceleration sensor at a first time point and a second time point in sequence respectively; calculating a first parameter correction amount for a function type corresponding to the operation of the function interface based on the first motion sensing data and the second motion sensing data; and transmitting the first parameter correction amount and the function type corresponding to the operation of the function interface to the projector at the second time point, so that the projector adjusts the projected image based on the first parameter correction amount and the function type corresponding to the operation of the function interface transmitted from the portable electronic device.

DESCRIPTION OF EMBODIMENTS

It is to be understood that other embodiment may be utilized and structural changes may be made without departing from the scope of the present disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Regarding the aforementioned technical contents, features and effects of the present disclosure, they will be clearly presented in the following detailed description of a preferred embodiment with reference to the drawings. Directional terms mentioned in the following embodiments, such as up, down, left, right, front or back, etc., are only for reference to the directions in the attached drawings. Accordingly, the directional terms used are illustrative and not limiting of the disclosure.

Other objectives, features and advantages of the present disclosure will be further understood from the further technological features disclosed by the embodiments of the present disclosure wherein there are shown and described preferred embodiments of this disclosure, simply by way of illustration of modes best suited to carry out the disclosure.

In order to achieve one, part or all of the above purposes or other purposes, the present disclosure provides a projected image correction system, a projected image correction method and a non-transitory computer-readable recording medium. The present disclosure utilizes a portable electronic device to correct the image projected by a projector intuitively, thereby replacing the existing method of making adjustment with buttons and cursor operations by mouse-like remote control.

Figure 1:
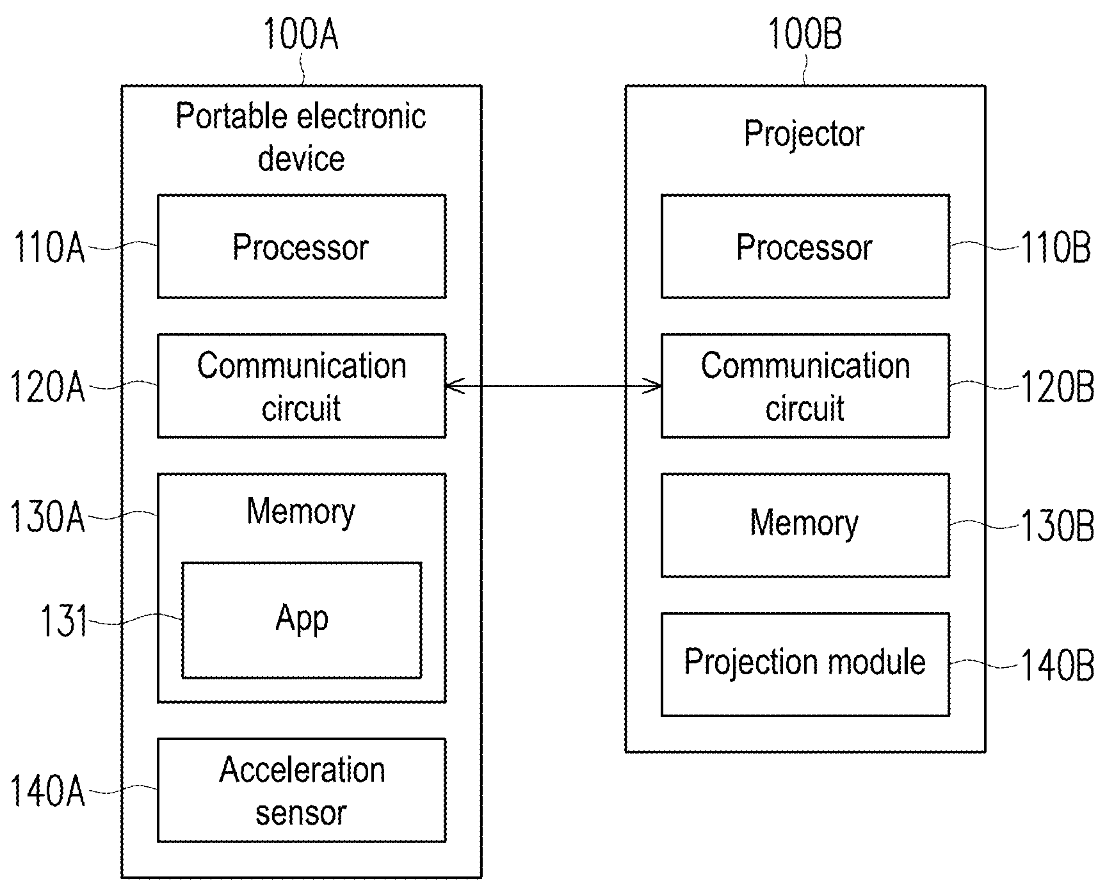
FIG. 1 is a block diagram of a projected image correction system according to an embodiment of the present disclosure.

FIG. 1 is a block diagram of a projected image correction system according to an embodiment of the present disclosure. Referring to FIG. 1, a projected image correction system 100 includes a portable electronic device 100A and a projector 100B. The portable electronic device 100A is communicatively connected to the projector 100B. The projector 100B is configured to project projected images. The portable electronic device 100A is configured to adjust the projected image.

In this embodiment, the portable electronic device 100A includes a processor 110A and an acceleration sensor 140A. The processor 110A is coupled to the acceleration sensor 140A. In addition, the portable electronic device 100A further includes a communication circuit 120A and a memory 130A. The processor 110A is coupled to the communication circuit 120A, the memory 130A and the acceleration sensor 140A. The number of processors 110A may be one or more. For convenience of explanation, only one processor 110A is shown here. It should be added that the coupling refers to, for example, an electrical signal connection.

The processor 110A may be a central processing unit (CPU), a physical processing unit (PPU), a programmable microprocessor, an embedded control chip, a digital signal processor (DSP), application specific integrated circuits (ASIC) or other similar devices. The plurality of processors 110A may adopt a combination of the above-described devices.

The communication circuit 120A is configured to communicate with other devices or communication networks to send and receive signals through the network. The communication circuit 120A may be a Bluetooth sending and receiving device, a WiFi module or a physical wired communication interface and/or a wireless communication interface. The wired communication interface may be implemented through a universal serial bus (USB) port, a general purpose interface bus (GPIB) port, or a local area network (LAN) port, etc. The wireless communication interface may be implemented using a wireless local area networks (WLAN) interface, a cellular network communication interface or a combination thereof.

The memory 130A may be implemented through any type of fixed or removable random access memory (RAM), read-only memory (ROM), flash memory, hard disk or other similar device or a combination of these devices. The memory 130A may exist independently and be connected to the processor 110A through a communication bus, or the memory 130A may be integrated with the processor 110A. The memory 130A may include a program code, which may be executed by the processor 110A. In this embodiment, the processor 110A executes the program code corresponding to the operation of the application (APP) 131.

In an embodiment, the memory 130A is a non-transitory computer-readable recording medium, and the APP 131 is stored in the non-transitory computer-readable recording medium, so that the processor 110A in the portable electronic device 100A performs the projected image correction method as described below after reading the non-transitory computer-readable recording medium. The non-transitory computer-readable recording medium may be a read-only memory, a flash memory, a floppy disk, a hard disk, an optical disk, a pen drive, a magnetic tape, a database accessible through the network, or non-transitory computer-readable recording media with the same functions that may be easily derived by a person skilled in the art.

In an embodiment, the APP 131 may be a computer program product, which includes at least one computer program or instruction. When downloaded and executed by the processor of the computer, the APP 131 may perform the projected image correction method as described below.

The acceleration sensor 140A is configured to detect acceleration of the portable electronic device 100A to obtain at least one motion sensing data. The processor 110A is adapted to receive at least one motion sensing data for the portable electronic device 100A from the acceleration sensor 140A.

In this embodiment, the projector 100B includes a processor 110B and a projection module 140B. The processor 110B is coupled to the projection module 140B. In addition, the projector 100B further includes a communication circuit 120B and a memory 130B. The processor 110B is coupled to the communication circuit 120B, the memory 130B and the projection module 140B. The number of the processor 110B may be one or more. For convenience of explanation, only one processor 110B is shown here.

The processor 110B may be, for example, a digital data processor (DDP), such as an image processor (model no. DLPC3436), which is only an example and the disclosure is not limited thereto. The processor 110B may also be implemented as a component such as a digital controller. The communication circuit 120B is configured to communicate with other devices or communication networks to send and receive signals through the network. The communication circuit 120B may be implemented using a wired communication interface and/or a wireless communication interface, the communication circuit 120B may be a Bluetooth sending and receiving device, a WiFi module or a physical wired communication interface and/or a wireless communication interface. The wired communication interface may be implemented through a universal serial bus (USB) port, a general purpose interface bus (GPIB) port, or a local area network (LAN) port, etc. The wireless communication interface may be implemented using a wireless local area networks (WLAN) interface, a cellular network communication interface or a combination thereof.

The memory 130B may be implemented in the same way as the memory 130A. The memory 130B may exist independently and be connected to the processor 110B through a communication bus, or the memory 130B may be integrated with the processor 110B. The memory 130B may include a program code, and the program code will be executed by the processor 110B, thereby driving (controlling) the projection module 140B to project the projected image.

The projection module 140B is configured to project the image data from the processor 110B out of the projector to form a projected image on a projection target (such as a curtain, a desktop or a wall, etc.). The projection module 140B includes an imaging element (such as a light valve), a projection lens, a light source (such as at least one light emitting diode (LED), at least one laser diode (LD), or a combination of the above), an optical element (such as reflectors, light-splitting elements, etc.) that transmits light beams. The imaging element (such as a light valve) is, for example, a reflective light modulator such as liquid crystal on silicon panel (LCOS panel) and digital micro-mirror device (DMD). In some embodiments, the imaging element (such as a light valve) may also be a transmissive optical modulator such as a transparent liquid crystal panel, an electro-optical modulator, a magneto-optic modulator, an acousto-optic modulator (AOM) and so on.

The portable electronic device 100A and the projector 100B communicate with each other via a wired or wireless communication protocol through the communication circuits 120A and 120B.

In the portable electronic device 100A, at least one motion sensing data sensed by the acceleration sensor 140A is transmitted to the processor 110A. The processor 110A calculates the parameter correction amount. The processor 110A also provides the parameter correction amount and function type as correction information to the communication circuit 120A and sends them to the projector 100B according to the function type for correction selected by the user.

In the projector 100B, the communication circuit 120B receives the correction information (including the parameter correction amount and function type) from the portable electronic device 100A, and provides the correction information to the processor 110B to adjust the projected image. In an embodiment, the projector 100B is a smart projector with a built-in operating system. The smart projector not only has an image processor for processing projected images, but also has an operating system processor specifically for the operating system. That is, the projector 100B has a multi-processor 110B (image processor and operating system processor). The correction information received by the communication circuit 120B of the projector 100B is first provided to the operating system processor. The operating system processor defines the correction information as information that is readable by the image processor, and then forwards the correction information to the image processor to adjust the projected image. It should be noted that the projector 100B may not have an operating system processor, and the portable electronic device 100A may define the correction information as information that is readable by the image processor and then provide the correction information to the image processor of the projector 100B.

The user may use the portable electronic device 100A with the acceleration sensor 140A to operate the correction of the projected image. Next, examples will be given for explanation in detail.

Figure 2:
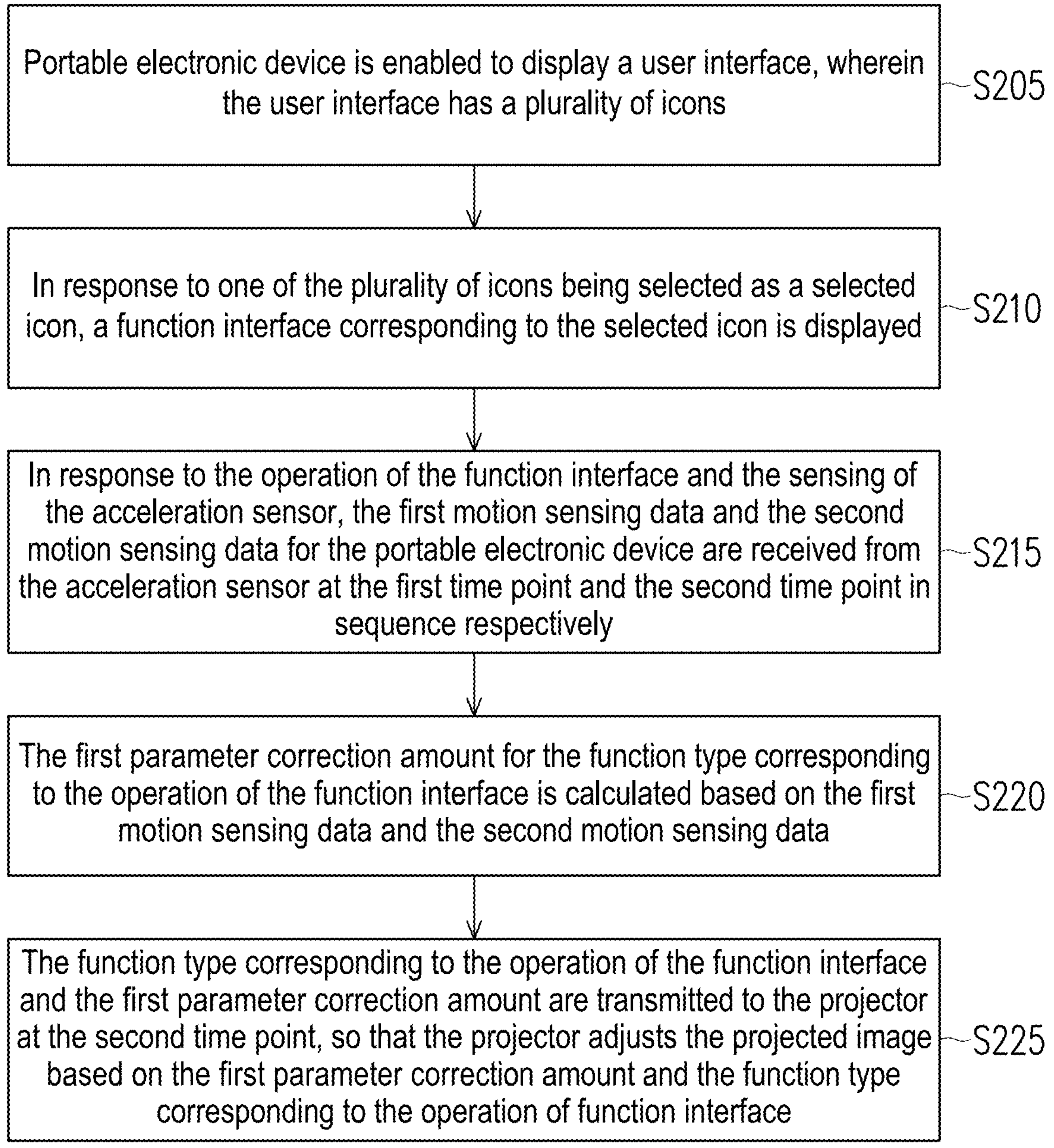
FIG. 2 is a flow chart of a projected image correction method according to an embodiment of the present disclosure.

FIG. 2 is a flow chart of a projected image correction method according to an embodiment of the present disclosure. In this embodiment, the processor 110A of the portable electronic device 100A is configured to execute the APP 131 to perform the following steps.

In step S205, the portable electronic device 100A is enabled to display a user interface. Here, the user interface has multiple icons. Next, in step S210, in response to one of the plurality of icons being selected as a selected icon, a function interface corresponding to the selected icon is displayed. For example, the portable electronic device 100A further includes a display, and the display has a touch sensing function. The display may be implemented through a liquid-crystal display (LCD), a thin film transistor liquid crystal display (TFT-LCD), an organic light-emitting diode display (OLED display), a light-emitting diode display (LED display), an electroluminescent display (ELD), etc. When the APP 131 is executed, the APP 131 provides a user interface to the portable electronic device 100A, enabling the display of the portable electronic device 100A to display the user interface. The user may click on the icon corresponding to keystone correction in the user interface through the display to display the function interface of keystone correction, or click on the icon corresponding to the four-corner correction in the user interface to display the function interface of four-corner correction.

In step S215, in response to the operation of the function interface and the sensing of the acceleration sensor 140A, the first motion sensing data and the second motion sensing data for the portable electronic device 100A are received from the acceleration sensor 140A at the first time point and the second time point in sequence respectively. Here, in the portable electronic device 100A, the acceleration sensor 140A continuously detects the motion sensing data for the portable electronic device 100A, and continuously sends the motion sensing data sensed at different time points to the processor 110A. The first motion sensing data and the second motion sensing data are motion sensing data detected at the first time point and the second time point respectively. Each motion sensing data includes the angle and/or angular acceleration of the portable electronic device 100A relative to the direction of gravity.

Next, in step S220, the first parameter correction amount (which may also be generally referred to as "parameter correction amount" hereinafter depending on the circumstances) for the function type corresponding to the operation of the function interface is calculated based on the first motion sensing data and the second motion sensing data. For example, the processor 110A calculates the change amount of the motion sensing data sensed by the acceleration sensor 140A relative to the reference sensing data, and converts the change amount into the first parameter correction amount.

Since the acceleration sensor 140A used by the portable electronic device 100A may vary depending on the brand and model name of the portable electronic device 100A, the algorithm for converting the change amount into a parameter correction amount also needs to be changed accordingly. In this embodiment, the comparison information (for example, the corresponding relationship between the brand model and the algorithm, e.g., algorithm A is adopted for portable electronic device of brand model A, algorithm B is adopted for portable electronic device of brand model B) is stored in the APP 131 in advance. After the portable electronic device 100A downloads the APP 131, the APP 131 may obtain the brand model of the portable electronic device 100A, and provide the corresponding algorithm based on the comparison information. When a portable electronic device of new brand model is released on the market, the supplier of the APP 131 may release new comparison information, and the user may update the comparison information in the portable electronic device 100A by updating the APP 131 in the portable electronic device 100A.

In addition, due to the limitations of hardware and/or software of different model names, the range of projected image that can be corrected by the projector 100B might be different, and it is even possible that the projectors 100B of some model names only have one of the correction functions (for example, only keystone correction, or only four-corner correction), so different algorithms might also need to be adopted. In this embodiment, it is possible to use the comparison information pre-stored in the APP 131 to allow the portable electronic device 100A to obtain the model name of the paired projector 100B after the portable electronic device 100A and the projector 100B are connected and paired, and then the corresponding algorithm will be provided based on the comparison information.

After obtaining the first parameter correction amount, in step S225, the function type corresponding to the operation of the function interface and the first parameter correction amount are transmitted to the projector 100B at the second time point, so that the projector 100B adjusts the projected image based on the first parameter correction amount and the function type corresponding to the operation of function interface. For example, the projector 100B adjusts the projected image on the projection target (for example, a curtain, a desktop or a wall, etc.) according to the first parameter correction amount and the function type corresponding to the operation of function interface.

Here, the process of converting the change amount of the motion sensing data relative to the reference sensing data into the parameter correction amount is performed on the portable electronic device 100A. However, in other embodiments, this conversion process may also be performed on the projector 100B. For example, the portable electronic device 100A may be responsible for transmitting the motion sensing data and the function type corresponding to the operation of the function interface to the projector 100B, and the projector 100B converts the motion sensing data and then transmits the converted motion sensing data to the projector 100B for correcting projected image.

In this embodiment, the user's operation on the function interface has an operation time. The operation time includes an initial time point and an end time point. The processor 110A of the portable electronic device 100A may set the first time point corresponding to the initial time point, set the first motion sensing data as a reference sensing data, and set the second time point to be earlier than or equal to the end time point. The processor 110A of the portable electronic device 100A is also configured to execute the APP 131 to perform the following: calculating the first change amount of the second motion sensing data relative to the reference sensing data, calculating the first parameter correction amount of the function type corresponding to the operation of the function interface based on the first change amount, and transmitting the first parameter correction amount and the function type corresponding to the operation of the function interface to the projector 100B at the second time point. Furthermore, if the operation time involves more than two time points, the processor 110A of the portable electronic device 100A sequentially receives the third motion sensing data to the N+3th motion sensing data for the portable electronic device 100A from the acceleration sensor 140A at the 3rd time point to the N+3th time point, wherein N is an integer greater than or equal to 0. The motion sensing data includes the second motion sensing data to the N+3th motion sensing data, and any two adjacent time points may have the same time interval. The N+3th time point is earlier than or equal to the end time point. The processor 110A of the portable electronic device 100A is further configured to execute the APP 131 to perform the following: calculating the N+2th change amount of the N+3th motion sensing data relative to the N+2th sensing data, calculating the N+2th parameter correction amount of the function type corresponding to the operation of the function interface based on the N+2th change amount, and transmitting the N+2th parameter correction amount and the function type corresponding to the operation of the function interface to the projector 100B at the N+3th time point. The above operation is explained in detail below with reference to FIG. 3.

Figure 3:
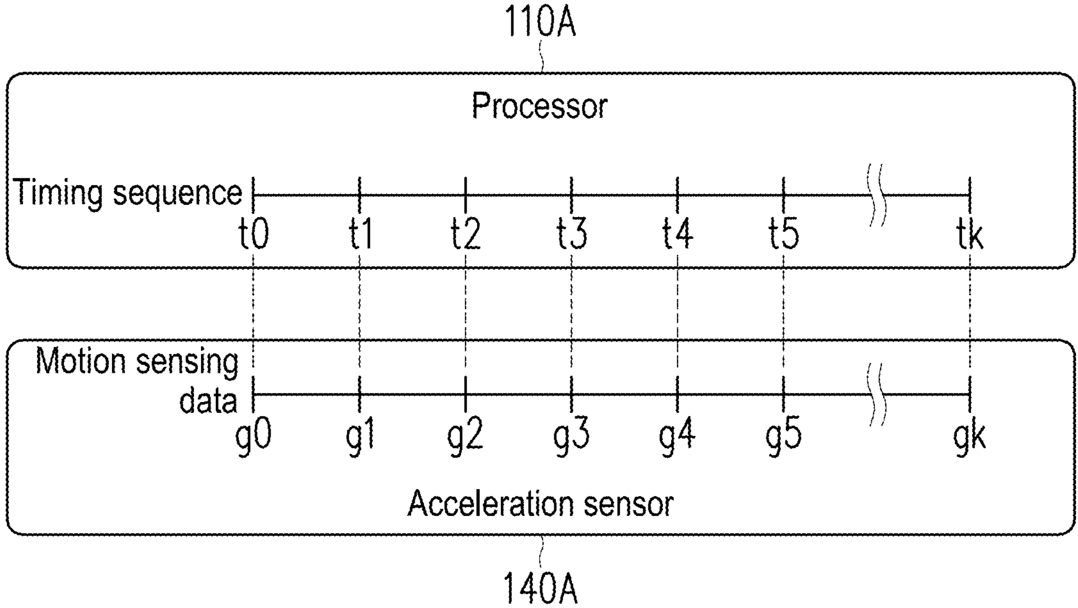
FIG. 3 is a schematic diagram of a timing sequence of obtaining motion sensing data in a portable electronic device according to an embodiment of the present disclosure.

FIG. 3 is a schematic diagram of a timing sequence of obtaining motion sensing data in a portable electronic device according to an embodiment of the present disclosure. In this embodiment, the operation time of the operation of the function interface includes the aforementioned initial time point (for example, time point t0) and the aforementioned end time point (for example, time point tk).

In the portable electronic device 100A, when the processor 110A determines that the initial time point for starting the operation of function interface is time point to, the processor 110A will obtain the motion sensing data at the current time point from the acceleration sensor 140A at regular time intervals. That is, at time point t0 (the first time point), the processor 110A obtains the currently sensed motion sensing data g0 (the first sensing data) from the acceleration sensor 140A; at time point t1 (the second time point), the processor 110A obtains the currently sensed motion sensing data g1 (the second sensing data) from the acceleration sensor 140A; at time point t2 (the third time point), the processor 110A obtains the currently sensed motion sensing data g2 (the third sensing data) from the acceleration sensor 140A; and by analogy, at time point tk (N+3th time point), the processor 110A obtains the currently sensed motion sensing data gk (N+3th sensing data) from the acceleration sensor 140A.

At time point t1 (the second time point), the processor 110A uses the motion sensing data g0 obtained at the previous time point, i.e., time point to (the first time point), as the reference sensing data, calculates the change amount (the first change amount) of the motion sensing data g1 relative to the reference sensing data (i.e., the motion sensing data g0), calculates the parameter correction amount (first parameter correction amount) of the function type corresponding to the operation of the function interface based on the change amount, and transmits the function type corresponding to the operation of the function interface and the parameter correction amount to the projector 100B.

At time point t2 (the third time point), the processor 110A uses the motion sensing data g1 obtained at the previous time point, i.e., time point t1 (the second time point), as the reference sensing data, calculates the change amount (the second change amount) of the motion sensing data g2 relative to the motion sensing data g1, calculates the parameter correction amount (second parameter correction amount) of the function type corresponding to the operation of the function interface based on the change amount, and transmits the function type corresponding to the operation of the function interface and the parameter correction amount to the projector 100B.

Assuming that there is no change in the motion sensing data g2 obtained at the time point t2 (the third time point) and the motion sensing data g1 obtained at the time point t1 (the second time point) (i.e., g2=g1), the processor 110A will still obtain the motion sensing data g2, and transmit the calculated change amount (i.e., 0) and the function type to the projector 100B.

At time point t3 (the fourth time point), the change amount of the motion sensing data g3 relative to the motion sensing data g2 obtained at the time point t2 is calculated, then the change amount is converted into a parameter correction amount (the third parameter correction amount), and the parameter correction amount and the function type are transmitted to the projector 100B. At time point t4 (the fifth time point), the change amount of the motion sensing data g4 relative to the motion sensing data g3 obtained at the time point t3 is calculated, then the change amount is converted into a parameter correction amount (the fourth parameter correction amount), and the parameter correction amount and the function type are transmitted to the projector 100B. At time point t5 (the sixth time point), the change amount of the motion sensing data g5 relative to the motion sensing data g4 obtained at the time point t4 is calculated, then the change amount is converted into a parameter correction amount (the fifth parameter correction amount), and the parameter correction amount and the function type are transmitted to the projector 100B. The change amount is calculated by analogy till the end time point. After the end time point of the operation of the function interface, the processor 110A stops receiving motion sensing data from the acceleration sensor 140A. It should be noted that the end time point is illustrated as time point tK in FIG. 3. The time at which the user stops operating the function interface is the end time point, which may be any one of the time point t1 (the second time point) through the time point tk, or does not correspond to the time point in FIG. 3. If the processor 110A determines that the end time point of the operation of enabling the function interface is the time point t1 or between the time point t1 and the time point t2, the processor 110A stops receiving motion sensing data from the acceleration sensor 140A. Alternatively, if the processor 110A determines that the end time point of the operation of enabling the function interface is between the time point tk-1 and the time point tk, the processor 110A stops receiving motion sensing data from the acceleration sensor 140A, that is, there will be no motion sensing data corresponding to the time point tk.

Therefore, please refer to FIG. 1 again. The projector 100B will adjust the projected image accordingly in real time based on the parameter correction amount and function type after the projector 100B receives the parameter correction amount and function type corresponding to the operation of the function interface, that is, the user may see the real-time changes of the projected image before and after the adjustment on the projection target.

In an embodiment, the function interface further includes one or more function icons. In the portable electronic device 100A, when the processor 110A detects that one of the function icons of the function interface is touched, it is determined that the current time point of the touch is the initial time point of the operation; and, after detecting that the touch on the touched function icon disappears, it is determined that the current time point is the end time point of the operation.

Alternatively, in another embodiment, in the portable electronic device 100A, when detecting that one of the function icons of the function interface is touched once, the processor 110A determines that the current time point of touch is the initial time point of the operation; and, when it is detected that the function icon that was touched once is touched again, the current time point is determined to be the end time point of the operation.

Figure 4:
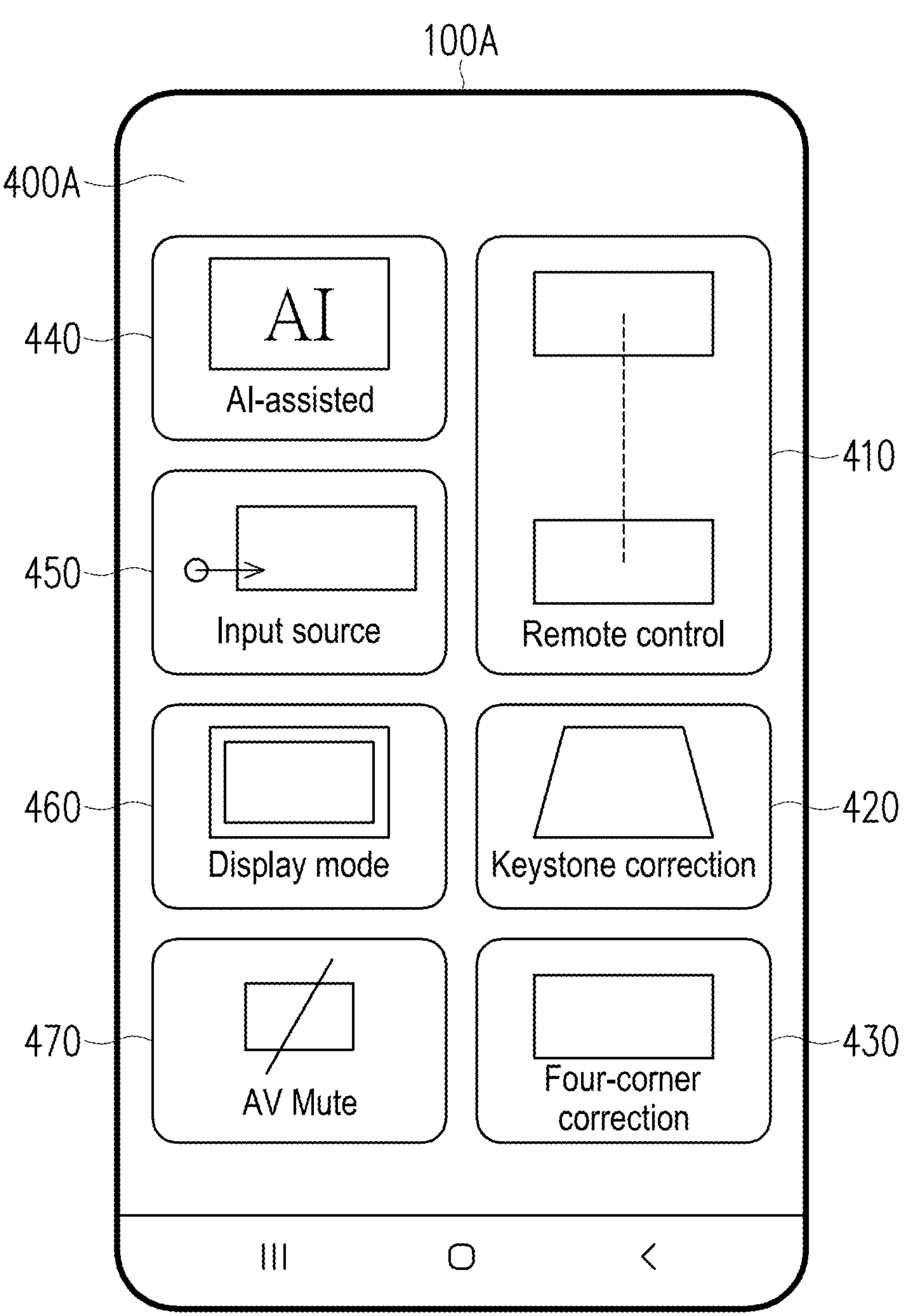
FIG. 4 is a schematic diagram of a user interface according to an embodiment of the present disclosure.

FIG. 4 is a schematic diagram of a user interface according to an embodiment of the present disclosure. In this embodiment, when the processor 110A of the portable electronic device 100A executes the APP 131, the user interface 400A corresponding to the projector 100B will be displayed on the display of the portable electronic device 100A, as shown in FIG. 4. The user interface 400A includes seven icons 410 to 470. However, the figure is only an example and the disclosure is not limited thereto.

The icon 410 corresponds to the function of remote control. After clicking on the icon 410, a function interface corresponding to the remote control is displayed on the display, and the projector 100B is remotely controlled through the function interface. The icon 420 corresponds to the function interface of keystone correction (providing three function icons corresponding to horizontal (H) correction, vertical (V) correction and rotation (R) correction). After clicking on the icon 420, the keystone correction is performed on the projected image through the function interface. The icon 430 corresponds to the function interface of four-corner correction (providing four function icons corresponding to correction of the four corners). After clicking on the icon 430, the four-corner correction is performed on the projected image through this function interface. The icon 440 corresponds to a function interface assisted by artificial intelligence (AI). After clicking on the icon 440, voice input may be used for communication with the AI model through this function interface. The icon 450 corresponds to the function interface of the input source. After clicking on the icon 450, the input source of the projected image of the projector 100A is switched through this function interface. The icon 460 corresponds to the function interface of the display mode. After clicking on the icon 460, the display mode of the projected image of the projector 100A is switched through this function interface. For example, the display mode includes a mirror/synchronous display mode and a non-mirror/extended desktop display mode. The icon 470 corresponds to the AV (audio-video) mute function. After clicking on the icon 470, it is possible to temporarily stop projecting the projected image and outputting the corresponding sound from the projector 100B by clicking on the icon 470. By clicking on the icon 470 again, it is possible to immediately drive the projector 100B to continue projecting the projected image and outputting the corresponding sound.

Figure 5:
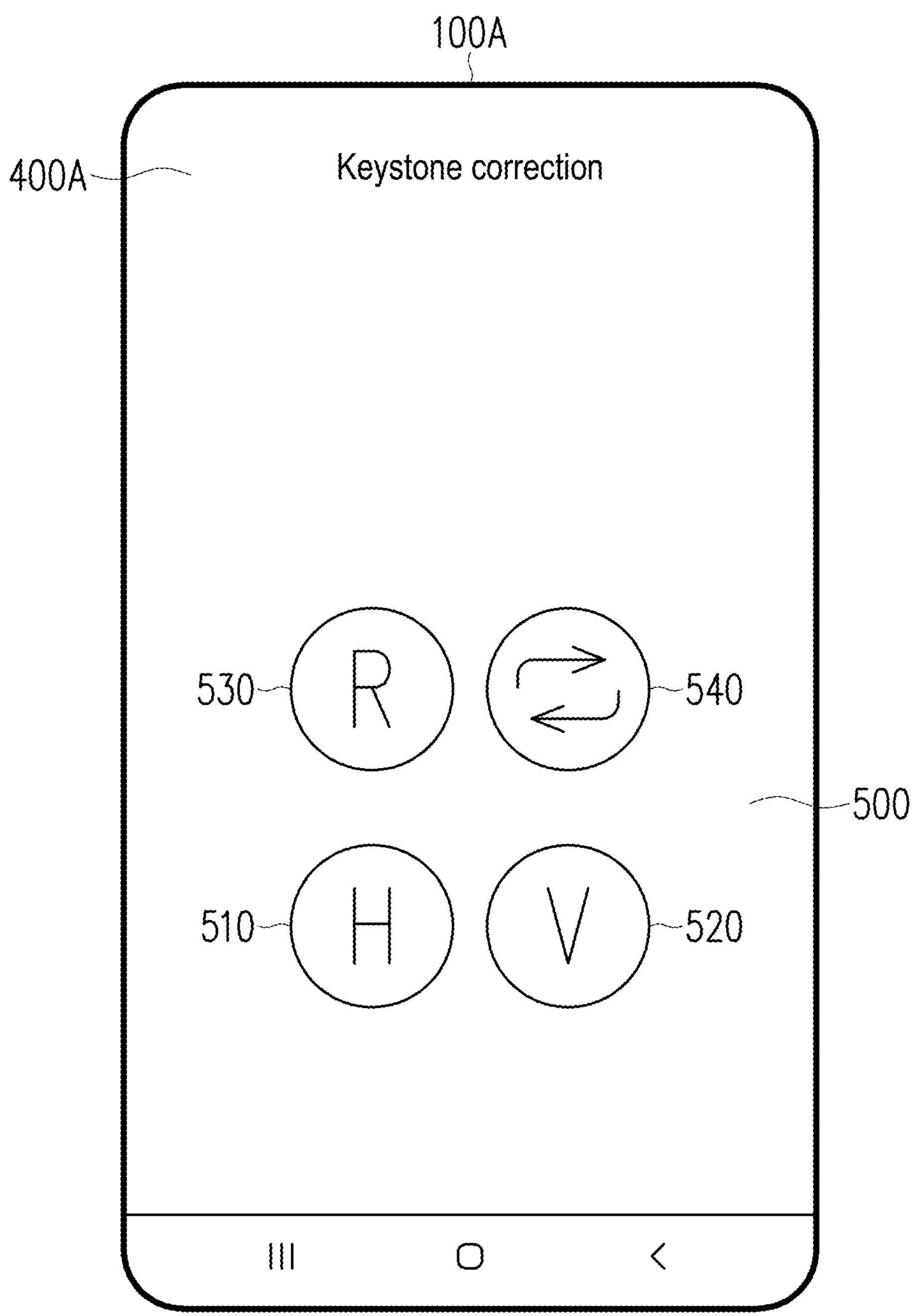
FIG. 5 is a schematic diagram of a function interface corresponding to keystone correction according to an embodiment of the present disclosure.

FIG. 5 is a schematic diagram of a function interface corresponding to keystone correction according to an embodiment of the present disclosure. In this embodiment, the user selects the icon 420 corresponding to the keystone correction (as shown in FIG. 4), and then the display of the portable electronic device 100A displays the function interface 500 corresponding to the keystone correction, so as to perform the keystone correction on the projected image through the function interface 500. As shown in FIG. 5, the function interface 500 includes four function icons 510, 520, 530, and 540. The function icons 510, 520, and 530 respectively correspond to function types of correction in different directions. The function icon 540 corresponds to the reset operation.

Here, the function icon 510 corresponds to horizontal correction. The function icon 520 corresponds to vertical correction. The function icon 530 corresponds to rotation correction.

In response to the operation of the function interface being selecting the function icon 520 for vertical correction, the processor 110A receives the first axis parameter value from the acceleration sensor 140A as the motion sensing data. In response to the operation of the function interface being selecting the function icon 510 for horizontal correction, the processor 110A receives the second axis parameter value from the acceleration sensor 140A as the motion sensing data. In response to the operation of the function interface being selecting the function icon 530 for rotation correction, the processor 110A receives the first axis parameter value and the second axis parameter value from the acceleration sensor 140A as the motion sensing data. In response to the operation of the function interface being selecting the function icon 540 for reset operation, the processor 110A restores the correction result to a default state or an uncorrected state.

The user may touch (press) one of the function icons 510, 520, and 530 in the user interface 400A (the current time point is regarded as the initial time point of the operation time) and touch continuously to perform correction on the projected image. The correction of the projected image will stop after the touch is stopped (the current time point is regarded as the end time point of the operation time). Alternatively, the user may perform correction on the projected image through a single touch (press) on one of the function icons 510, 520, and 530 in the user interface 400A (the current time point is regarded as the initial time point of the operation time), and then the correction on the projected image may be stopped through a single touch (press) again on the function icon previously touched once (the current time point is regarded as the end time point of the operation time).

For example, the values output by the acceleration sensor 140A include the values of the three axes, namely X, Y, and Z. In response to the operation of the function interface, for example, when the user selects a function icon and then rotates the portable electronic device 100A, it is possible to change the values of the acceleration sensor 140A corresponding to the X-axis and Y-axis. It should be noted that since the Z-axis corresponds to the direction of gravity, the value corresponding to the Z-axis will not change.

When the user selects one of the function icons 510, 520, and 530, the APP 131 will use the motion sensing data sensed by the acceleration sensor 140A at the current time point (for example, the time point t0 shown in FIG. 3) at which one of the function icons 510, 520, and 530 is selected as the reference sensing data. For example, assuming that the motion sensing data (X, Y, Z) obtained by the user who selects one of the function icons 510, 520, and 530 at the time point t0 is (1, 2, 3), then the subsequent correction calculation will use (1, 2, 3) as the reference sensing data.

Assuming that the motion sensing data (X, Y, Z) obtained by the user who selects one of the function icons 510, 520, and 530 at the time point t0 is (4, 5, 6), then the subsequent correction calculation will use (4, 5, 6) as the reference sensing data.

After determining the reference sensing data, the user may flip the portable electronic device 100A according to the correction requirements, and correct the projected image accordingly based on the change amount in the motion sensing data.

The change amount of each motion sensing data relative to the reference sensing data will affect the magnitude of the parameter correction amount corresponding thereto. The greater the change amount, the greater the parameter correction amount; the less the change amount, the less the parameter correction amount. For example, the motion sensing data may have angular changes in the X, Y, and Z axes relative to the reference sensing data, but for different function types (for example, keystone correction includes three function types corresponding to horizontal correction, vertical correction, and rotation correction, and four-corner correction includes four function types corresponding to the correction of the four corners), the types of change amount in the motion sensing data required for calculating parameter correction amount are also different.

The following embodiment will be used to illustrate how to operate the portable electrical device 100A to adjust the projected image.

Figure 6:
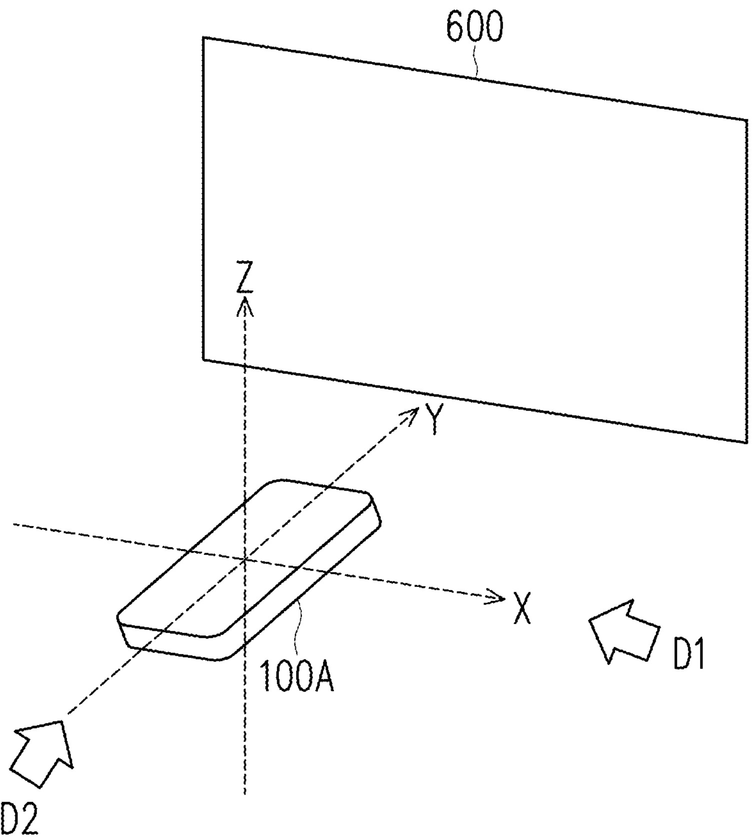
FIG. 6 is a schematic diagram of a portable electronic device and a projection target corresponding to keystone correction according to an embodiment of the present disclosure.

FIG. 6 is a schematic diagram of a portable electronic device and a projection target corresponding to keystone correction according to an embodiment of the present disclosure. Referring to FIG. 6, the projection target 600 is, for example, a curtain, a desktop, or a wall. The projector 100B projects a projected image toward the projection target 600 and adjusts the projected image accordingly by flipping the portable electronic device 100A.

Figure 7A:
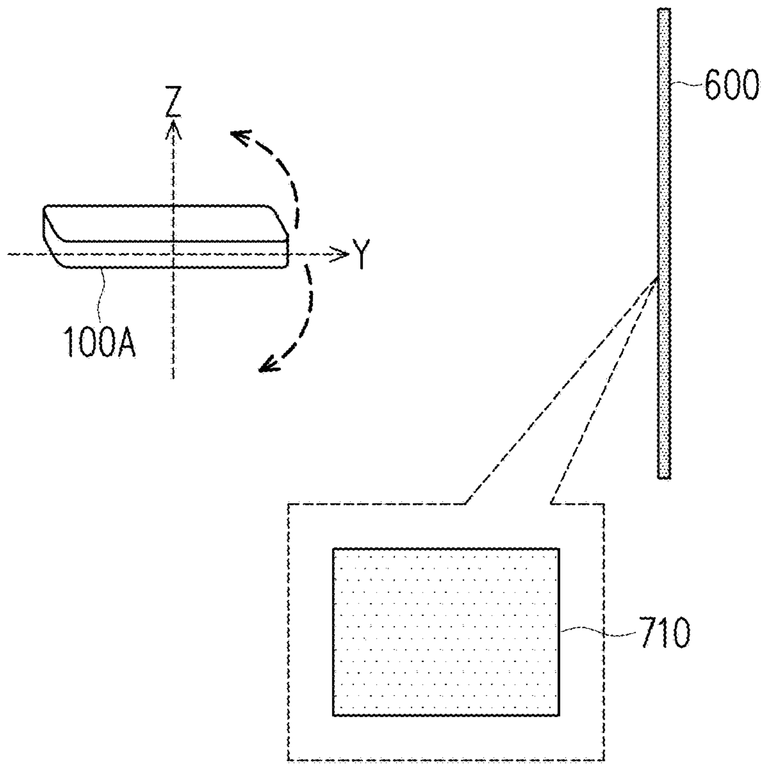
FIG. 7A to FIG. 7C are schematic diagrams of using a portable electronic device to perform vertical correction of keystone correction according to an embodiment of the present disclosure.
Figure 7B:
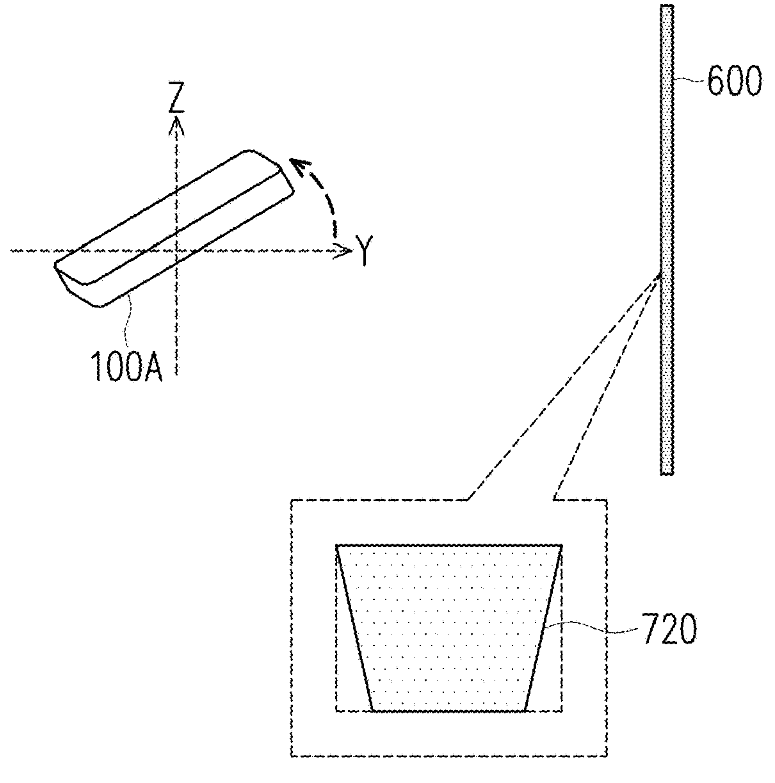
Figure 7C:
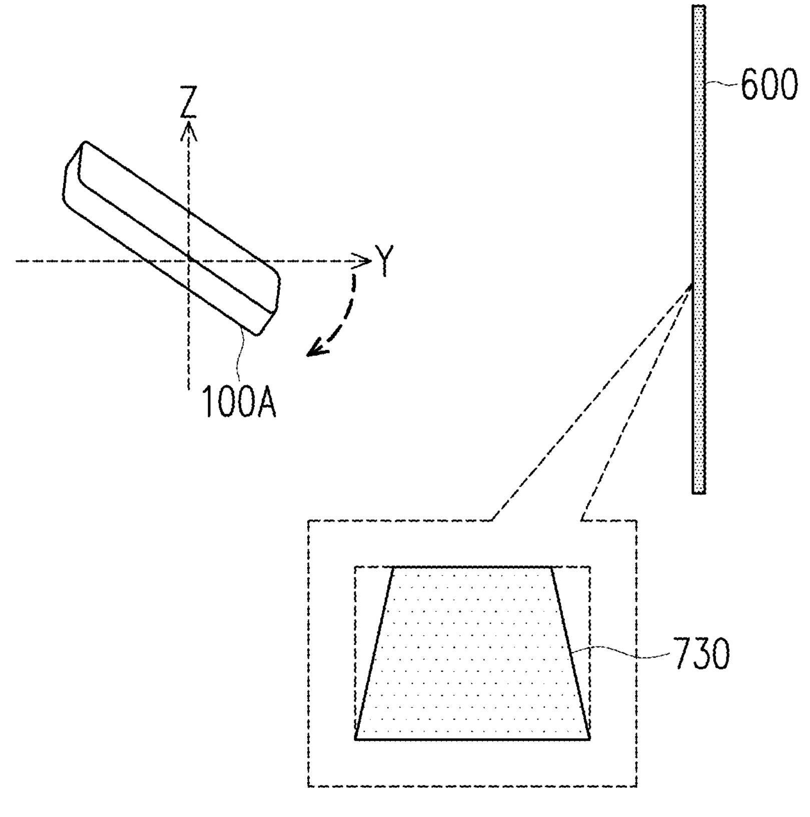
Figure 8A:
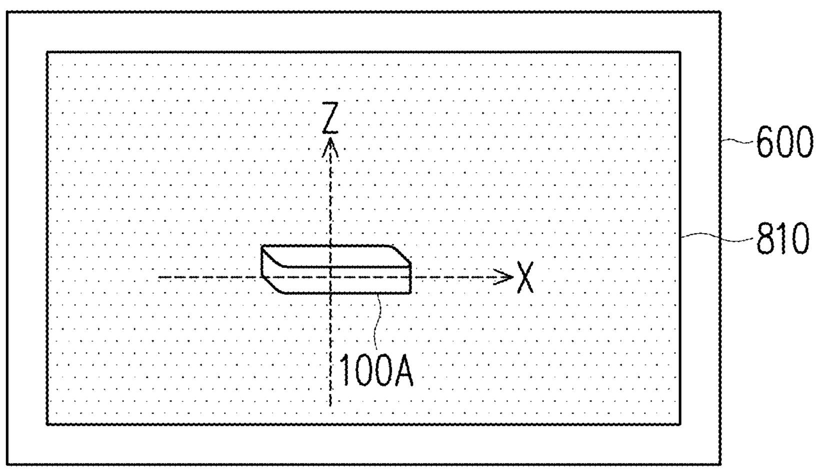
FIG. 8A to FIG. 8C are schematic diagrams of using a portable electronic device to perform horizontal correction of keystone correction according to an embodiment of the present disclosure.
Figure 8B:
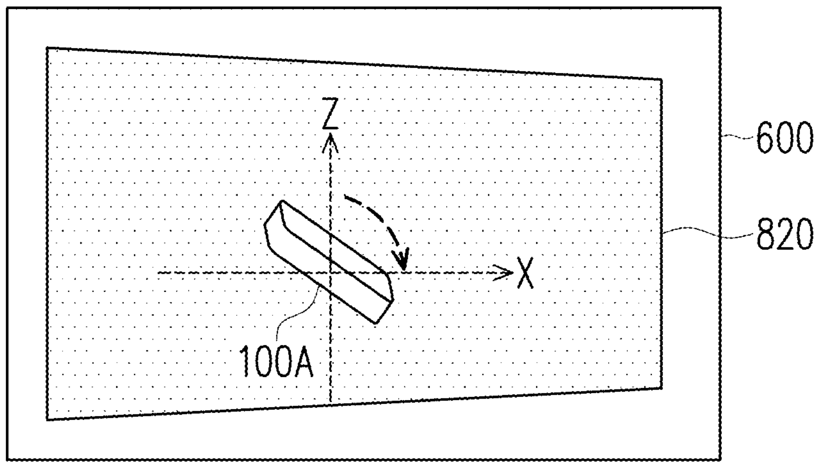
Figure 8C:
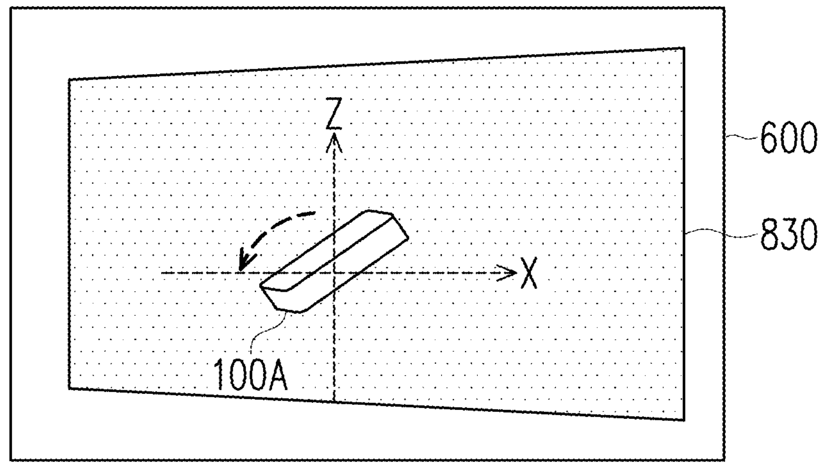
Figure 9A:
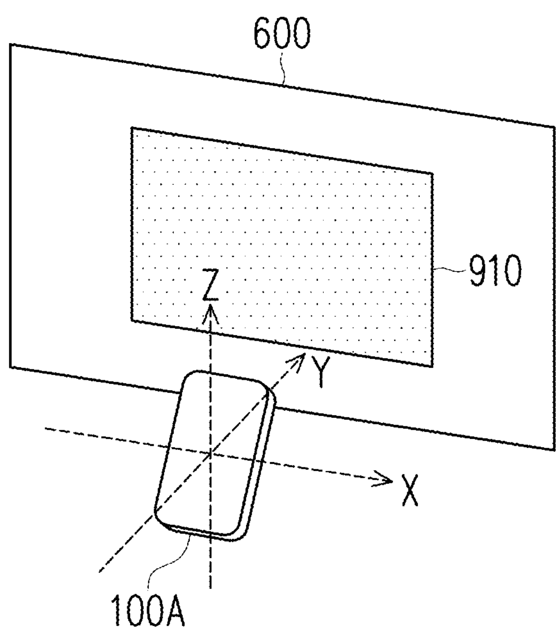
FIG. 9A to FIG. 9C are schematic diagrams of using a portable electronic device to perform rotation correction of keystone correction according to an embodiment of the present disclosure.
Figure 9B:
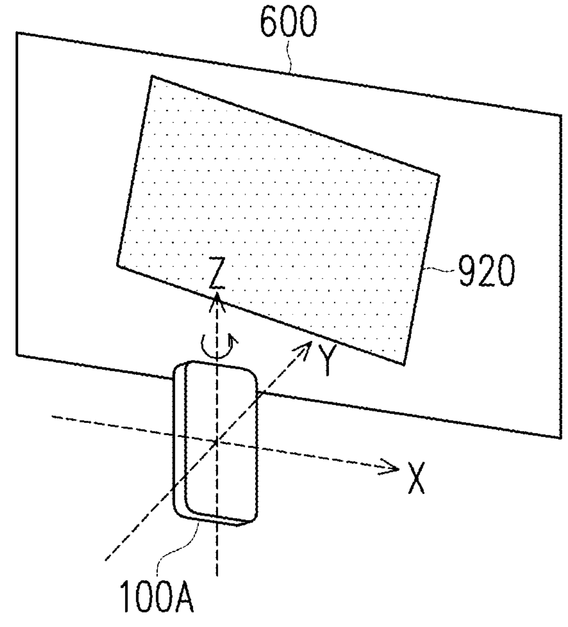
Figure 9C:
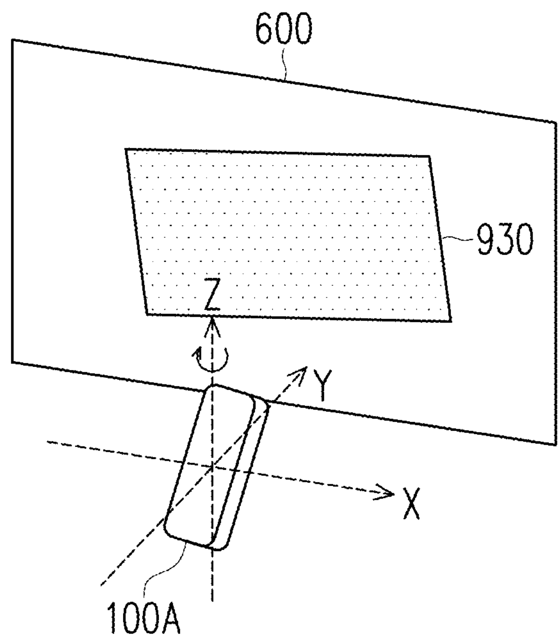

FIG. 7A to FIG. 7C are schematic diagrams of using a portable electronic device to perform vertical correction of keystone correction according to an embodiment of the present disclosure. FIG. 8A to FIG. 8C are schematic diagrams of using a portable electronic device to perform horizontal correction of keystone correction according to an embodiment of the present disclosure. FIG. 9A to FIG. 9C are schematic diagrams of using a portable electronic device to perform rotation correction of keystone correction according to an embodiment of the present disclosure.

The examples shown in FIG. 7A to FIG. 7C are side views viewed in the direction D1 shown in FIG. 6. In the viewing angle shown in FIG. 7A to FIG. 7C, the X-axis direction may be as shown in FIG. 6. The user holds the portable electronic device 100A, during the operation time when the user continues to press (touch) the function icon 520 for vertical correction, the processor 110A of the portable electronic device 100A obtains motion sensing data of the portable electronic device 100A at intervals of time. In the operation time, the portable electronic device 100A is inclined upward or downward toward one side of the projection target 600 with the X-axis as the rotation axis, so as to perform vertical correction on the projected image.

In the function interface 500 of keystone correction, when the user selects the function icon 520 for vertical correction, the portable electronic device 100A is inclined upward or downward toward one side of the projection target 600 with the X-axis as the rotation axis, and the above action of the portable electronic device 100A will cause the value of Y-axis in the motion sensing data to change. The processor 110A of the portable electronic device 100A calculates the parameter correction amount based on the angular change amount (ΔY) corresponding to the Y-axis in the motion sensing data obtained by the acceleration sensor 140A.

The projected image 710 shown in FIG. 7A is an image before adjustment. The portable electronic device 100A shown in FIG. 7B is inclined upward toward one side of the projection target 600 with the X-axis as the rotation axis, that is, the portable electronic device 100A is pressed down (turned backward) toward one side of the user, so that the projector 100B is able to adjust accordingly in real time to obtain the projected image 720 after adjustment. The portable electronic device 100A shown in FIG. 7C is inclined downward toward one side of the projection target 600 with the X-axis as the rotation axis, that is, the portable electronic device 100A is pressed down (turned forward) toward one side of the projection target 600, so that the projector 100B is able to adjust accordingly in real time to obtain the projected image 730 after adjustment.

The portable electronic device 100A transmits the parameter correction amount to the projector 100B, and the projector 100B adjusts the projected image 710 according to the parameter correction amount accordingly, in this way, the user is able to see the projected image 730 after adjustment in real time, or the user is able to see the projected image 720 after adjustment in real time. Moreover, the user is able to instantly see the real-time changes in the projected image after adjustment corresponding to different time points.

The examples shown in FIG. 8A to FIG. 8C are side views viewed in the direction D2 shown in FIG. 6. In the viewing angle shown in FIG. 8A to FIG. 8C, the Y-axis direction may be as shown in FIG. 6. The user holds the portable electronic device 100A, during the operation time when the user continues to press (touch) the function icon 510 for horizontal correction, the processor 110A of the portable electronic device 100A obtains motion sensing data of the portable electronic device 100A at intervals of time. In the operation time, the portable electronic device 100A is inclined to the left or to the right toward the projection target 600 with the Y-axis as the rotation axis, so as to perform horizontal correction on the projected image.

In the function interface 500 of keystone correction, when the user selects the function icon 510 for horizontal correction, the portable electronic device 100A is inclined to the left or to the right toward the projection target 600 with the Y-axis as the rotation axis, and the above action of the portable electronic device 100A will cause the value of X-axis in the motion sensing data to change. The processor 110A of the portable electronic device 100A calculates the parameter correction amount based on the angular change amount (ΔX) corresponding to the X-axis in the motion sensing data obtained by the acceleration sensor 140A.

The projected image 810 shown in FIG. 8A is an image before adjustment. The portable electronic device 100A shown in FIG. 8B is inclined to the right with the Y-axis as the rotation axis, that is, the portable electronic device 100A is flipped to the right, so that the projector 100B flips the projected image 810 to the right; in this way, the user is able to see the projected image 820 after adjustment in real time. The portable electronic device 100A shown in FIG. 8C is inclined to the left with the Y-axis as the rotation axis, that is, the portable electronic device 100A is flipped to the left, so that the projector 100B flips the projected image 810 to the left; in this way, the user is able to see the projected image 830 after adjustment in real time. Accordingly, the user is able to instantly see the real-time changes in the projected image after adjustment corresponding to different time points.

The examples shown in FIG. 9A to FIG. 9C show that, in the function interface 500 for keystone correction, the user holds the portable electronic device 100A, during the operation time when the user continues to press (touch) the function icon 530 for rotation correction, the processor 110A of the portable electronic device 100A obtains motion sensing data of the portable electronic device 100A at intervals of time. In the operation time, the portable electronic device 100A is rotated with the Z-axis as the rotation axis, and the processor 110A of the portable electronic device 100A calculates parameter correction amount based on the angular change amount (ΔX) corresponding to the X-axis and the angular change amount (ΔY) corresponding to the Y-axis in the motion sensing data obtained by the acceleration sensor 140A.

The portable electronic device 100A transmits the parameter correction amount to the projector 100B. The projector 100B adjusts the projected image 910 according to the parameter correction amount accordingly. The user is able to see that the projected image 910 rotates to the right in real time and becomes a projected image 920, or the user is able to see that the projected image 910 rotates to the left in real time and becomes the projected image 930. Therefore, the user is able to instantly see the real-time changes of the projected image after adjustment corresponding to different time points.

In other words, when the function icon 510 for horizontal correction is selected, the processor 110A only reads the value of the X-axis in the motion sensing data to calculate the change amount. When the function icon 520 for vertical correction is selected, the processor 110A only reads the value of the Y-axis in the motion sensing data to calculate the change amount. When the function icon 530 for rotation correction is selected, the processor 110A reads the values of both the X-axis and the Y-axis in the motion sensing data to calculate the change amount.

Figure 10:
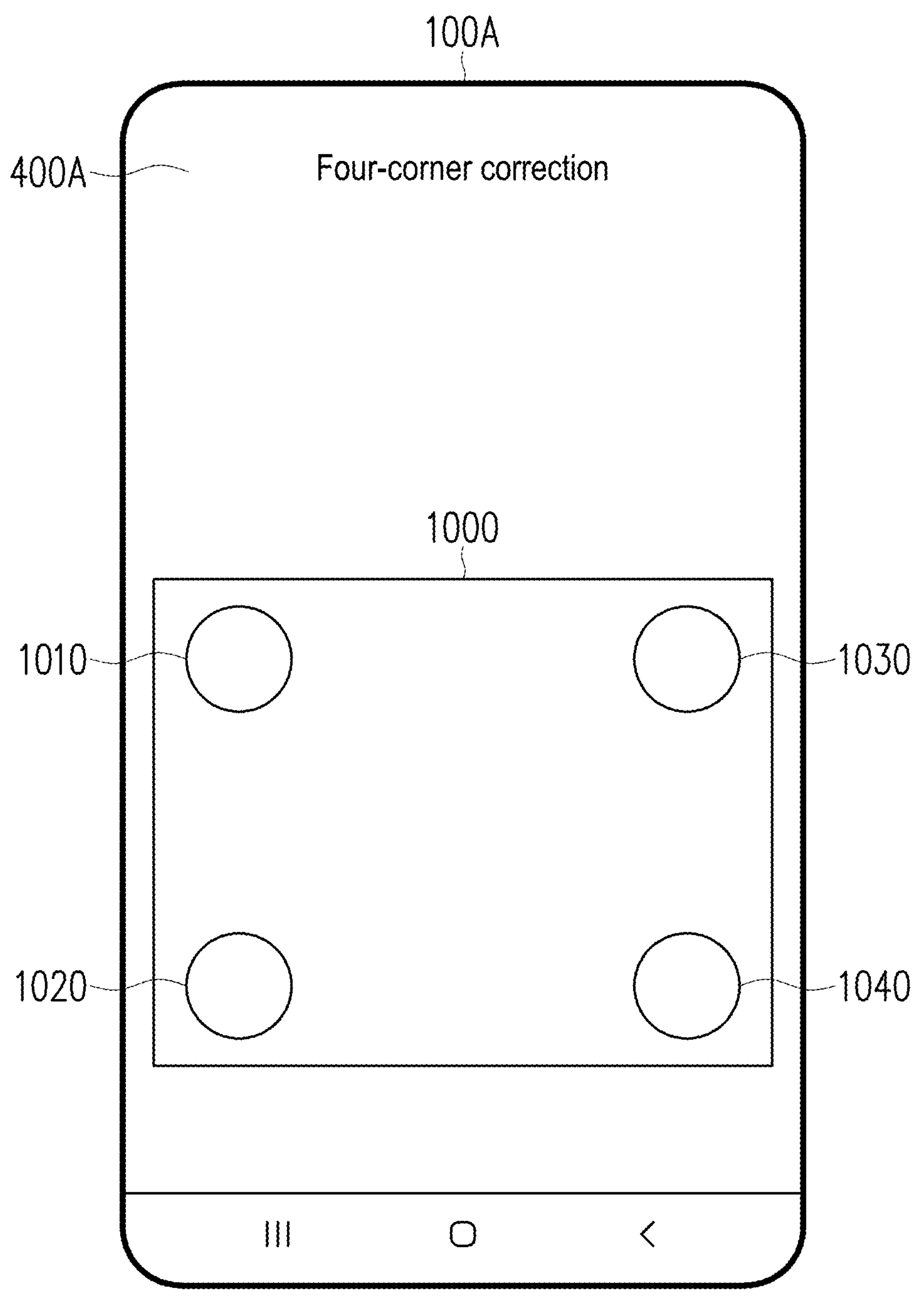
FIG. 10 is a schematic diagram of a function interface corresponding to four-corner correction according to an embodiment of the present disclosure.

FIG. 10 is a schematic diagram of a function interface corresponding to four-corner correction according to an embodiment of the present disclosure. In the embodiment, the user selects the icon 430 corresponding to the four-corner correction (as shown in FIG. 4), then the portable electronic device 100A displays the function interface 1000 corresponding to the four-corner correction, so as to perform four-corner correction on the projected image through the function interface 1000. The function interface 1000 includes four function icons 1010 to 1040, which respectively correspond to the four corner positions (upper left, lower left, upper right, and lower right) in the projected image.

In response to one of the function icons being selected as a selected function icon, after calculating the parameter correction amount corresponding to the selected function icon, the processor 110A transmits the corner position and parameter correction amount corresponding to the selected function icon to the projector 100B, so that the projector 100B adjusts the projected image from the corresponding corner position based on the corner position and parameter correction amount transmitted from the processor 110A.

Figure 11A:
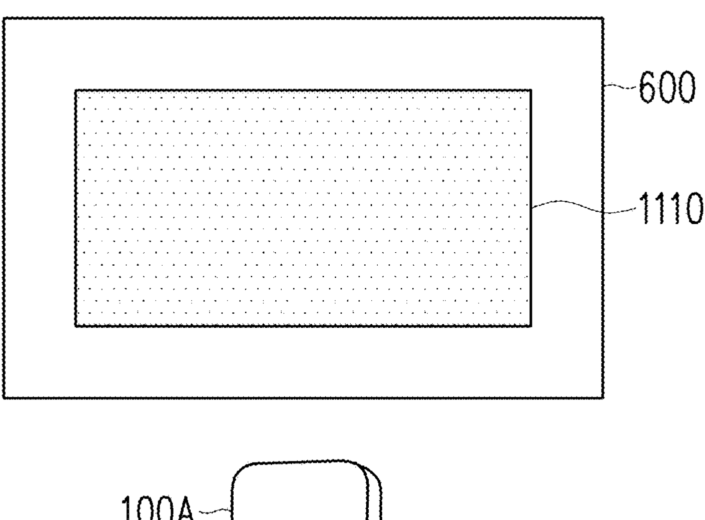
FIG. 11A and FIG. 11B are schematic diagrams of using a portable electronic device to perform four-corner correction according to an embodiment of the present disclosure.
Figure 11B:
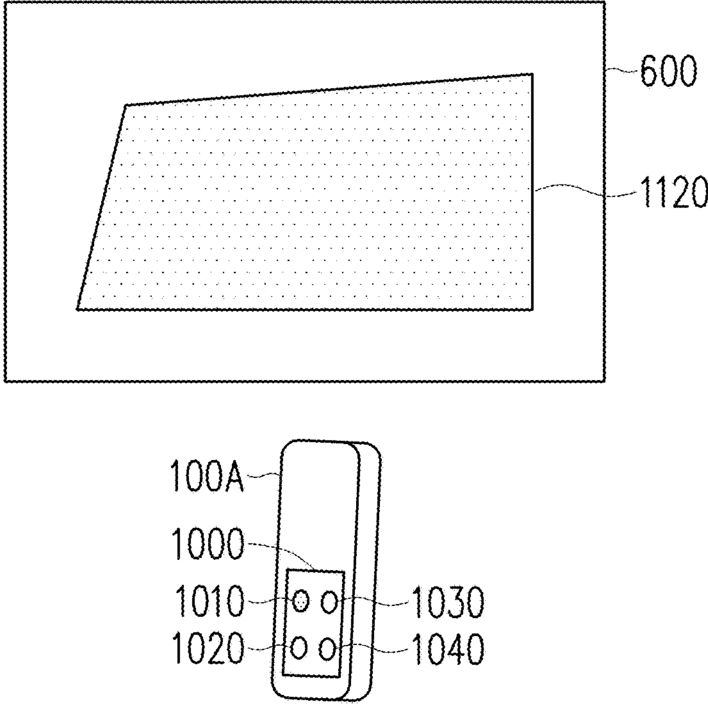

FIG. 11A and FIG. 11B are schematic diagrams of using a portable electronic device to perform four-corner correction according to an embodiment of the present disclosure. In this embodiment, function icon 1010 is taken as an example for explanation. Other function icons 1020 to 1040 may be deduced in the same way and will not be described again.

At the current time point when the user presses (touches) the function icon 1010 in the function interface 1000 for four-corner correction, the processor 110A sets the current time point as the initial time point of the operation, and obtains the reference sensing data of the initial time point. During the period when the user continues to press (touch) the function icon 1010, as shown in the embodiment of FIG. 3, motion sensing data is acquired at intervals of time and the parameter correction amount is calculated until the user no longer presses (touches) the function icon 1010. When the processor 110A detects that the pressing of the function icon 1010 is released, the current time point is set as the end time point.

When the function icon 1010 is long pressed, the processor 110A determines the reference sensing data. When the user swings (swings back and forth or left and right) the portable electronic device 100A, the acceleration sensor 140A senses the values corresponding to the X-axis and Y-axis and outputs the motion sensing data to the processor 110A. The processor 110A of the portable electronic device 100A calculates the parameter correction amount corresponding to the vertical (V) correction in the upper left corner based on the angular change amount (ΔY) corresponding to the Y-axis in the motion sensing data, and calculates the parameter correction amount corresponding to the horizontal (H) correction in the upper left corner based on the angular change amount (ΔX) of the X-axis in the motion sensing data. Afterwards, the processor 110A transmits the corner position (upper left corner) corresponding to the function icon 1010, as well as the parameter correction amount for vertical correction and the parameter correction amount for horizontal correction to the projector 100B through the communication circuit 120A. In this way, the projector adjusts the upper left corner of the projected image in real time according to the parameter correction amount for vertical correction and the parameter correction amount for horizontal correction, so that the position of the upper left corner of the projected image 1110 (corresponding to the corner position of the function icon 1010) is adjusted in the horizontal and vertical directions, thereby obtaining the projected image 1120 shown in FIG. 11B. The correction for other corners of the projected image may also be deduced in the same way.

When selecting the function icon 1010 (the corner position is the upper left corner) for performing four-corner correction, the APP 131 takes the change amount of the Y-axis to calculate the parameter correction amount for vertical (V) correction in the upper left corner, and takes the change amount of the X-axis to calculate the parameter correction amount for horizontal (H) correction in the upper left corner, and enables the projector 100B to adjust the coordinates of the upper left corner of the projected image 1110 and react in the projected image 1120 in real time. In other words, to make the upper left corner of the projected image 1110 to be displaced in the vertical direction, it is required to rotate the portable electronic device 100A with the X-axis as the rotation axis to obtain the change amount of the Y-axis. To make the upper left corner of the projected image 1110 to be displaced in the horizontal direction, it is required to rotate the portable electronic device 100A with the Y-axis as the rotation axis to obtain the change amount of the X-axis. To make the upper left corner of the projected image 1110 to be displaced in both the horizontal and the vertical directions, it is required to rotate the portable electronic device 100A with the Z-axis as the rotation axis to obtain the change amount of the X-axis and Y-axis.

In other embodiments, the vertical (V) correction and the horizontal (H) correction may also be separately corrected for the same corner. The principles are the same as above and will not be described again.

In addition, in another embodiment, other than calculating the angular change amount, the angular acceleration change amount may further be calculated. The processor 110A obtains motion sensing data from the acceleration sensor 140A at every interval, and calculates the angular change amount of the motion sensing data relative to the reference sensing data and the angular acceleration change amount during this time interval, thereby allowing the APP 131 to calculate the parameter correction amount. After obtaining the reference sensing data, the acceleration sensor 140A continues to obtain motion sensing data at every fixed interval of time. The acceleration sensor 140A provides the APP 131 with a comparison of the change amount of the changed angle in the motion sensing data relative to the angle of the reference sensing data. Moreover, the acceleration sensor 140A further senses the angular acceleration during the time interval to calculate the change amount of the angular acceleration. For example, the angular acceleration at the time point t1 is subtracted from the angular acceleration at the time point t0, thus obtaining the change amount in angular acceleration within the unit time period from the time point t0 to the time point t1. The angular acceleration at the time point t2 is subtracted from the angular acceleration at the time point t1, thereby obtaining the change amount in angular acceleration within the unit time period from the time point t1 to the time point t2. The angular acceleration change amount of multiple unit times are obtained by analogy. The APP 131 will calculate the parameter correction amount corresponding to one or both of the angular change amount and the angular acceleration change amount.

During the operation time of the function interface by the user, the angular acceleration of flipping the portable electronic device 100A will also affect the parameter correction amount. The faster the portable electronic device 100A is flipped over per unit time, the greater the angular acceleration, the greater the parameter correction amount, and the greater the change in the projected image; the slower the portable electronic device 100A is flipped per unit time, the smaller the angular acceleration, the smaller the parameter correction amount, and the smaller the change in the projected image. For example, if the portable electronic device 100A is flipped by 30 degrees within a unit time of 200 milliseconds, the angular acceleration thereof will be greater than the angular acceleration of the portable electronic device 100A flipped by 10 degrees within a unit time of 200 milliseconds. Therefore, when the portable electronic device 100A is flipped by 30 degrees within a unit time of 200 milliseconds, the parameter correction amount thereof will be greater than the parameter correction amount of the portable electronic device 100A flipped by 10 degrees within a unit time of 200 milliseconds. Flipping the portable electronic device 100A during the operation time of the function interface by the user, the operation time may, for example, further involve multiple unit times, for example, the operation time is 1.1 seconds and the unit time is 200 milliseconds, which means that during the operation time of the portable electronic device 100A, the acceleration sensor 140A obtains the angular change amount and the angular acceleration change amount every 200 milliseconds and transmits them to the processor 110A, and transmits correction information (parameter correction amount and function type) to the projector 100B five times within 1.1 seconds, and makes a total of five adjustments to the projected image in real time. Specifically, the calculation period is the period between the time point at which the latest motion sensing data is obtained and the time point at which the previous motion sensing data is obtained. Taking the above situation as an example, at the 200th millisecond, the change amount (angular change amount, angular acceleration change amount) between 0 and 200 milliseconds is obtained; at the 400th millisecond, the change amount between 200 and 400 milliseconds is obtained, and the end time point is 1.1th second (which is less than one unit time, so there is no sixth adjustment).

According to the user's needs, any one of "angular change amount of the flipped angle relative to the reference sensing data" and "angular acceleration change amount during the flip" may be set as the basis for calculating the parameter correction amount, or both of them may be set as the basis for calculating the parameter correction amount. When both of them are set as basis for calculation, the parameter correction amounts calculated based on the two will be directly added or weighted. For example: when the first control group is flipped by 30 degrees within 200 milliseconds, and the second control group is flipped by 30 degrees within 400 milliseconds, since the angular change amounts of the first control group and the second control group are the same while the angular acceleration change amount of the first control group is higher, the parameter correction amount of the first control group is higher after addition or weighted calculation.

The APP 131 transmits the correction information (function type and parameter correction amount) to the projector 100B, and the projector 100B adjusts the projected image according to the function type and parameter correction amount. Specifically, the APP 131 will transmit the "function type" (for example, the function type corresponding to the pressed function icon) selected by the user and the "parameter correction amount" calculated above as correction information to the projector 100B. The frequency of transmission is, for example, immediate transmission while every time the processor 110A obtains motion sensing data from the acceleration sensor 140A. For example, if regularly sensed motion sensing data is obtained every 200 milliseconds, correction information is transmitted to the projector 100B every 200 milliseconds. After receiving the correction information, the projector 100B will adjust the projected image accordingly, and project and display the image to the user.

After the user selects the function icon in the user interface 400A, if the user does not cancel the selection of the "function icon", the APP 131 will continue to calculate the motion sensing data obtained from the acceleration sensor 140A and convert the motion sensing data into the parameter correction amount, and continuously transmit the correction information (function type and parameter correction amount) to the projector 100B, so that the projector 100B performs correction continuously. Correction will not stop until the user cancels the selection of "function icon". The above "cancel selection" action may be different depending on the "select" action. For example: If the "select" action is performed by long pressing, the "cancel selection" action may be performed by releasing. If the "select" action is performed by a single click, the "cancel selection" action may be performed by click again. However, the above actions are only examples and may actually be changed to any common selection method.

Although only keystone correction and four-corner correction are mentioned in the embodiment, the same principle may also be applied to other types of adjustment items, which are all covered in the scope to be protected by the present disclosure. The correction processes of the above two are similar, and the only difference lies in the types of correction functions.

In summary, the projected image correction system, the projected image correction method and the non-transitory computer-readable recording medium according to the embodiments of the present disclosure have at least one of the following advantages. In the projected image correction system, a portable electronic device communicatively connects to a projector. The portable electronic devices are, for example, smartphones, tablets, laptops, smart watches, etc. with built-in acceleration sensors. However, the present disclosure is not limited thereto. All devices with an acceleration sensor and a processor are applicable to the present disclosure. The portable electronic device detects whether the user rotates the portable electronic device to the left/right or forward/backward, and transmits the correction information (parameter correction amount and function type) obtained after rotation to the projector, thus allowing the projector to perform corresponding correction operations on the projected image, and then intuitively correct the projected image of the projector.

The user may rotate the portable electronic device left/right or forward/backward to replace the action of clicking on the adjustment buttons of the existing remote control and also replace the cursor operation of the mouse-like remote control. Using portable electronic devices to intuitively perform image correction on projectors makes it possible to replace existing button adjustments and cursor operations performed by mouse-like remote control. In this way, it is possible to simplify and accelerate the correction process on the projected image for the user, so that projected images may be corrected more intuitively.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the disclosure", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the present disclosure as defined by the following claims. Moreover, no element and component in the present disclosure is intended to be dedicated to the public regardless of whether the element or component is explicitly recited in the following claims.

What is claimed is:

1. A projected image correction system, comprising: a projector and a portable electronic device, wherein the projector is configured to project a projected image; and the portable electronic device is communicatively connected to the projector, and the portable electronic device comprises an acceleration sensor and a processor, the processor is adapted to receive at least one motion sensing data for the portable electronic device from the acceleration sensor when the portable electronic device is rotated around a first axis, a second axis or a third axis, and the projected image is adjusted in real time accordingly, and the first axis, the second axis and the third axis are perpendicular to each other, wherein the processor of the portable electronic device is configured to execute an application to:

enable the portable electronic device to display a user interface, wherein the user interface has a plurality of icons, and the plurality of icons of the user interface comprises an icon corresponding to keystone correction;

in response to one of the plurality of icons being selected as a selected icon, display a function interface corresponding to the selected icon, wherein when the icon corresponding to the keystone correction is selected, the function interface corresponding to the keystone correction is displayed, and the function interface corresponding to the keystone correction comprises a function icon for vertical correction, a function icon for horizontal correction and a function icon for rotation correction;

in response to an operation of the function interface and a sensing of the acceleration sensor, receive a first motion sensing data and a second motion sensing data for the portable electronic device from the acceleration sensor at a first time point and a second time point in sequence respectively, wherein the at least one motion sensing data comprises the first motion sensing data and the second motion sensing data;

calculate a first parameter correction amount for a function type corresponding to the operation of the function interface based on the first motion sensing data and the second motion sensing data; and transmit the first parameter correction amount and the function type corresponding to the operation of the function interface to the projector at the second time point, wherein the projector is configured to:

adjust the projected image based on the first parameter correction amount and the function type corresponding to the operation of the function interface transmitted from the portable electronic device, wherein the projected image is adjusted with the third axis as a rotation axis when the function icon for horizontal correction is selected and the portable electronic device is rotated, the projected image is adjusted with the second axis as a rotation axis when the function icon for vertical correction is selected and the portable electronic device is rotated.

2. The projected image correction system according to claim 1, wherein an operation time of the operation of the function interface comprises an initial time point and an end time point, the processor sets the first time point to correspond to the initial time point, sets the first motion sensing data as a reference sensing data, and sets the second time point to be earlier than or equal to the end time point; wherein the processor of the portable electronic device is further configured to execute the application to perform the following steps:

calculating a first change amount of the second motion sensing data relative to the reference sensing data;

calculating the first parameter correction amount of the function type corresponding to the operation of the function interface based on the first change amount; and transmitting the first parameter correction amount and the function type corresponding to the operation of the function interface to the projector at the second time point.

3. The projected image correction system according to claim 2, wherein the processor receives a third motion sensing data to a N+3th motion sensing data for the portable electronic device from the acceleration sensor from a 3rd time point to a N+3th time point, wherein N is equal to 0 or a positive integer greater than 0, the at least one motion sensing data comprises the second motion sensing data to the N+3th motion sensing data, and any two adjacent time points have a same time interval, the N+3th time point is earlier than or equal to the end time point, and the processor of the portable electronic device is further configured to execute the application to perform the following steps:

calculating a N+2th change amount of the N+3th motion sensing data relative to a N+2th sensing data;

calculating a N+2th parameter correction amount of the function type corresponding to the operation of the function interface based on the N+2th change amount; and transmitting the N+2th parameter correction amount and the function type corresponding to the operation of the function interface to the projector at the N+3th time point.

4. The projected image correction system according to claim 1, wherein each of the at least one motion sensing data comprises an angle and/or an angular acceleration corresponding to the portable electronic device relative to a direction of gravity.

5. The projected image correction system according to claim 2, wherein the processor of the portable electronic device is further configured to execute the application to perform the following steps:

stopping receiving the at least one motion sensing data from the acceleration sensor after the end time point of the operation of the function interface.

6. The projected image correction system according to claim 5, wherein the function interface comprises at least one function icon, the processor of the portable electronic device is further configured to execute the application to perform the following steps:

determining a current time point as the initial time point of the operation while detecting that one function icon of the at least one function icon of the function interface is touched; and determining a current time point as the end time point of the operation while detecting that a touch on the one function icon of the at least one function icon of the function interface disappears.

7. The projected image correction system according to claim 5, wherein the function interface comprises at least one function icon, the processor of the portable electronic device is further configured to execute the application to perform the following steps:

determining a current time point as the initial time point of the operation while detecting that one function icon of the at least one function icon of the function interface is touched once; and determining a current time point as the end time point of the operation while detecting that the one function icon of the at least one function icon of the function interface is touched again.

8. The projected image correction system according to claim 1, wherein the processor of the portable electronic device is further configured to execute the application to perform the following steps:

in response to the operation of the function interface being selecting the function icon for vertical correction, receiving a first axis parameter value from the acceleration sensor as the at least one motion sensing data;

in response to the operation of the function interface being selecting the function icon for horizontal correction, receiving a second axis parameter value from the acceleration sensor as the at least one motion sensing data; and in response to the operation of the function interface being selecting the function icon for rotation correction, receiving the first axis parameter value and the second axis parameter value from the acceleration sensor as the at least one motion sensing data.

9. A projected image correction method, adaptable for a projected image correction system, the projected image correction system comprising a projector and a portable electronic device, wherein the projector is configured to project a projected image, the portable electronic device is communicatively connected to the projector, and the portable electronic device comprises an acceleration sensor and a processor, the processor is adapted to receive at least one motion sensing data for the portable electronic device from the acceleration sensor when the portable electronic device is rotated around a first axis, a second axis or a third axis, and the projected image is adjusted in real time accordingly, and the first axis, the second axis and the third axis are perpendicular to each other, the processor is configured to execute an application to perform the following steps:

enabling the portable electronic device to display a user interface, wherein the user interface has a plurality of icons, and the plurality of icons of the user interface comprises an icon corresponding to keystone correction;

in response to one of the plurality of icons being selected as a selected icon, displaying a function interface corresponding to the selected icon, wherein when the icon corresponding to the keystone correction is selected, the function interface corresponding to the keystone correction is displayed, and the function interface corresponding to the keystone correction comprises a function icon for vertical correction, a function icon for horizontal correction and a function icon for rotation correction;

in response to an operation of the function interface and a sensing of the acceleration sensor, receiving a first motion sensing data and a second motion sensing data for the portable electronic device from the acceleration sensor at a first time point and a second time point in sequence respectively, wherein the at least one motion sensing data comprises the first motion sensing data and the second motion sensing data;

calculating a first parameter correction amount for a function type corresponding to the operation of the function interface based on the first motion sensing data and the second motion sensing data; and transmitting the first parameter correction amount and the function type corresponding to the operation of the function interface to the projector at the second time point, so that the projector adjusts the projected image based on the first parameter correction amount and the function type corresponding to the operation of the function interface transmitted from the portable electronic device, wherein the projected image is adjusted with the third axis as a rotation axis when the function icon for horizontal correction is selected and the portable electronic device is rotated, the projected image is adjusted with the second axis as a rotation axis when the function icon for vertical correction is selected and the portable electronic device is rotated.

10. The projected image correction method according to claim 9, wherein an operation time of the operation of the function interface comprises an initial time point and an end time point, the processor sets the first time point to correspond to the initial time point, sets the first motion sensing data as a reference sensing data, and sets the second time point to be earlier than or equal to the end time point; wherein the processor of the portable electronic device is further configured to execute the application to perform the following steps:

calculating a first change amount of the second motion sensing data relative to the reference sensing data;

calculating the first parameter correction amount of the function type corresponding to the operation of the function interface based on the first change amount; and transmitting the first parameter correction amount and the function type corresponding to the operation of the function interface to the projector at the second time point.

11. The projected image correction method according to claim 10, wherein the processor receives a third motion sensing data to a N+3th motion sensing data for the portable electronic device from the acceleration sensor from a 3rd time point to a N+3th time point, wherein N is equal to 0 or a positive integer greater than 0, the at least one motion sensing data comprises the second motion sensing data to the N+3th motion sensing data, and any two adjacent time points have a same time interval, the N+3th time point is earlier than or equal to the end time point, and the processor is further configured to execute the application to perform the following steps:

calculating a N+2th change amount of the N+3th motion sensing data relative to a N+2th sensing data;

calculating a N+2th parameter correction amount of the function type corresponding to the operation of the function interface based on the N+2th change amount; and transmitting the N+2th parameter correction amount and the function type corresponding to the operation of the function interface to the projector at the N+3th time point.

12. The projected image correction method according to claim 9, wherein each of the at least one motion sensing data comprises an angle and/or an angular acceleration corresponding to the portable electronic device relative to a direction of gravity.

13. The projected image correction method according to claim 10, wherein the processor is further configured to execute the application to perform the following steps:

stopping receiving the at least one motion sensing data from the acceleration sensor after the end time point of the operation of the function interface.

14. The projected image correction method according to claim 13, wherein the function interface comprises at least one function icon, the processor is further configured to execute the application to perform the following steps:

determining a current time point as the initial time point of the operation while detecting that one function icon of the at least one function icon of the function interface is touched; and determining a current time point as the end time point of the operation while detecting that a touch on the one function icon of the at least one function icon of the function interface disappears.

15. The projected image correction method according to claim 13, wherein the function interface comprises at least one function icon, the processor is further configured to execute the application to perform the following steps:

determining a current time point as the initial time point of the operation while detecting that one function icon of the at least one function icon of the function interface is touched once; and determining a current time point as the end time point of the operation while detecting that the one function icon of the at least one function icon of the function interface is touched again.

16. The projected image correction method according to claim 9, wherein the processor is further configured to execute the application to perform the following steps:

in response to the operation of the function interface being selecting the function icon for vertical correction, receiving a first axis parameter value from the acceleration sensor as the at least one motion sensing data;

in response to the operation of the function interface being selecting the function icon for horizontal correction, receiving a second axis parameter value from the acceleration sensor as the at least one motion sensing data; and in response to the operation of the function interface being selecting the function icon for rotation correction, receiving the first axis parameter value and the second axis parameter value from the acceleration sensor as the at least one motion sensing data.

17. A non-transitory computer-readable recording medium, which records an application, and loads the application through a processor of a portable electronic device to perform the following steps:

enabling the portable electronic device to display a user interface, wherein the user interface has a plurality of icons, and the plurality of icons of the user interface comprises an icon corresponding to keystone correction;

in response to one of the plurality of icons being selected as a selected icon, displaying a function interface corresponding to the selected icon, wherein when the icon corresponding to the keystone correction is selected, the function interface corresponding to the keystone correction is displayed, and the function interface corresponding to the keystone correction comprises a function icon for vertical correction, a function icon for horizontal correction and a function icon for rotation correction;

in response to an operation of the function interface and a sensing of an acceleration sensor of the portable electronic device, receiving a first motion sensing data and a second motion sensing data for the portable electronic device from the acceleration sensor when the portable electronic device is rotated around a first axis, a second axis or a third axis, and the projected image is adjusted in real time accordingly, and the first axis, the second axis and the third axis are perpendicular to each other at a first time point and a second time point in sequence respectively;

calculating a first parameter correction amount for a function type corresponding to the operation of the function interface based on the first motion sensing data and the second motion sensing data; and transmitting the first parameter correction amount and the function type corresponding to the operation of the function interface to a projector at the second time point, so that the projector adjusts a projected image based on the first parameter correction amount and the function type corresponding to the operation of the function interface transmitted from the portable electronic device, wherein the projected image is adjusted with the third axis as a rotation axis when the function icon for horizontal correction is selected and the portable electronic device is rotated, the projected image is adjusted with the second axis as a rotation axis when the function icon for vertical correction is selected and the portable electronic device is rotated.

18. A projected image correction system, comprising: a projector and a portable electronic device, wherein the projector is configured to project a projected image; and the portable electronic device is communicatively connected to the projector, and the portable electronic device comprises an acceleration sensor and a processor, the processor is adapted to receive at least one motion sensing data for the portable electronic device from the acceleration sensor, wherein the processor of the portable electronic device is configured to execute an application to:

enable the portable electronic device to display a user interface, wherein the user interface has a plurality of icons, the plurality of icons of the user interface comprise an icon corresponding to four-corner correction;

in response to one of the plurality of icons being selected as a selected icon, display a function interface corresponding to the selected icon, when the icon corresponding to the four-corner correction is selected, the function interface is corresponding to the four-corner correction, and the function interface corresponding to the four-corner correction comprises four function icons, the four function icons respectively correspond to four corner positions in the projected image;

in response to an operation of the function interface and a sensing of the acceleration sensor, receive a first motion sensing data and a second motion sensing data for the portable electronic device from the acceleration sensor at a first time point and a second time point in sequence respectively, wherein the at least one motion sensing data comprises the first motion sensing data and the second motion sensing data;

calculate a first parameter correction amount for a function type corresponding to the operation of the function interface based on the first motion sensing data and the second motion sensing data; and transmit the first parameter correction amount and the function type corresponding to the operation of the function interface to the projector at the second time point, wherein the projector is configured to:

adjust the projected image based on the first parameter correction amount and the function type corresponding to the operation of the function interface transmitted from the portable electronic device, wherein one of the corner positions of the projected image is adjusted with a first axis and/or a second axis as a rotation axis.

19. The projected image correction system according to claim 18, wherein in response to one of the four function icons being selected as a selected function icon, the processor of the portable electronic device is further configured to execute the application to perform the following steps: after calculating the first parameter correction amount corresponding to the selected function icon, transmitting the corner position corresponding to the selected function icon and the first parameter correction amount to the projector, so that the projector adjusts the projected image from the corner position based on the corner position and the first parameter correction amount transmitted from the processor.

* * * * *